United States Patent [19]

Winiasz

[11] 4,197,877

[45] Apr. 15, 1980

[54] PRESSURE REDUCING VALVE

[75] Inventor: Michael E. Winiasz, Lorain, Ohio

[73] Assignee: The Clark-Reliance Corp., Cleveland, Ohio

[21] Appl. No.: 867,114

[22] Filed: Jan. 5, 1978

[51] Int. Cl.² .............................................. F16K 1/08
[52] U.S. Cl. .............................. 137/625.3; 137/489.5; 251/120
[58] Field of Search ................................ 251/122, 120; 137/625.3, 625.34, 454.2, 454.6, 489.5

[56] References Cited

U.S. PATENT DOCUMENTS

| | | | |
|---|---|---|---|
| 2,639,556 | 5/1953 | Spence | 137/489.5 |
| 3,791,413 | 2/1974 | Muller | 137/625.3 |
| 3,971,411 | 7/1976 | Baumann | 137/625.3 |

FOREIGN PATENT DOCUMENTS 634181  1/1962  Canada ................................ 137/489.5

*Primary Examiner*—Alan Cohan

[57] ABSTRACT

A pressure reducing valve that is particularly adapted for use with steam at high pressures and temperatures. The valve embodies a main valve seat member that is provided with a valve seat and flow control means disposed downstream of the valve seat to prevent development of zones of excessive velocity of flow through the valve seat and to prevent excessive noise in operation. The position of the main valve spool that controls flow through the main valve seat is controlled by a piston operating in a cylinder and the supply of fluid under pressure to the cylinder is controlled by a pilot valve assembly. The main valve seat member and the main valve spool and the pilot valve assembly can readily be removed from and replaced in the housing of the valve without breaking the connections between the housing and external fluid conduits.

4 Claims, 7 Drawing Figures

PRESSURE REDUCING VALVE

FIELD OF THE INVENTION

This invention relates to pressure reducing valves and more particularly to valves adapted to deliver steam at a desired reduced pressure from a source of high pressure steam having, for example, a pressure of the order of 600 pounds per square inch and a temperature of the order of 750° F. Valves of this type have been used in various installations where steam under high pressure and temperature is available and steam under reduced pressure is required for various purposes. For example, pressure reducing valves are used widely in petroleum refineries, in the chemical process industries and on ship board. While the valve disclosed herein is designed particularly with reference to the control of steam pressures, it is to be understood that the invention may also be utilized in conjunction with the control and reduction of pressure in systems embodying other gases such as air under high pressure.

BACKGROUND OF THE INVENTION

A well-known type of pressure reducing valve embodies a housing having an inlet opening for a high pressure gas and a discharge opening for the gas at reduced pressure. Flow through the housing is controlled by a main valve that is moved away from its seat against the force of a spring by pressure from the inlet side of the valve applied to a piston that can lift the valve member away from its seat against the action of the spring. The application of pressure to the piston is controlled by a pilot valve which controls the flow of high pressure gas to the actuating piston for the main valve. The pilot valve is responsive to pressure on the outlet side of the main valve, the pilot valve being controlled by a spring which tends to move the pilot valve toward open position and a pressure responsive member acting in opposition to the spring and arranged so that an increase in the discharge pressure of the valve will cause the pilot valve to move toward its seat, thus reducing the pressure applied to the piston that controls the main valve and permitting the main valve spring to move the main valve toward its seat, thereby reducing the discharge pressure.

Valves of this general type are in wide use. Currently available valves are subject to the objections that they are bulky; that replacement of worn components such as the pilot valve and main valve and their respective seats is difficult and expensive; and that they are noisy in operation due to the high velocity and sometimes improperly controlled flow of fluid through them.

It has been proposed to ameliorate the noise problem by employing a valve member with grooves in the surface thereof over which the gas flows as it passes through the orifice provided by the main valve member and the valve seat. A valve of this kind is shown in the Muller U.S. Pat. No. 3,791,413. In valves of this construction, the effect of the grooves in the valve member varies with the position or degree of opening of the valve member.

Prior devices of this general type also have been bulky. Also, replacement of the parts subject to wear, such as the pilot valve assembly and the main valve seat and valve member, have been expensive and time-consuming operations.

SUMMARY OF THE INVENTION

A general object of the present invention is the provision of an improved valve adapted for service with expansible fluids such as steam under high pressure and temperature conditions and which obviates or minimizes the difficulties encountered with valves of the prior art intended for similar purposes. More specific objects are the provision of such a valve that is compact and which can be manufactured at reasonable cost, the provision of such a valve embodying a main valve and a pilot valve in which the pilot valve assembly can be removed and replaced as a unit with little difficulty, and the provision of such a valve in which the main valve seat and main valve spool may also be removed and replaced with little difficulty. Another object is the provision of such a valve in which quiet operation is obtained as compared to the operation of prior valves under similar circumstances. A further object is the provision of a valve in which the gas flowing past the main valve member and valve seat flows through a passage provided with means such as internal grooves immediately beyond the valve seat which function to distribute the flow of fluid substantially uniformly around the circumference of the valve member and through the valve seat and to eliminate much of the noise that is generated under conditions of high pressure and rapid flow in valves of this general type.

Briefly, according to a preferred form of the present invention, the foregoing and other objects of the invention are accomplished by providing a valve housing having inlet and discharge passages separated by a partition which is apertured to receive a separately formed valve seat. A valve spool having a closure portion disposed on the inlet side of the valve seat is arranged to be actuated in the opening direction by a piston disposed on the outlet side of the valve seat and is urged toward the valve seat by a spring. These parts are all aligned so they can be readily removed from the housing by opening a closure plate. The pilot valve mechanism is disposed on the inlet side of the partition. The pilot valve operating mechanism is co-axial with the pilot valve and also with the main valve and valve seat. The pilot valve and its operating mechanism are arranged to be removable as a unit by simply removing a plate from the housing. Actuating pressures for the main valve and pilot valve are supplied through passages formed in the housing and leading respectively from the inlet and outlet passages of the housing.

The main valve seat member is provided with a number of circumferentially spaced arcuate internal grooves disposed on the downstream side of the seat and lying in planes parallel to the axis of the seat. These are exposed to the flow of fluid through the main valve seat through a distance that is constant regardless of the position of the valve. These grooves create a slight resistance to the flow of fluid beyond the valve seat, which resistance is distributed substantially uniformly around the circumference of the valve seat immediately beneath the valve orifice. The grooves function to insure that the flow of fluid through the valve seat and past the valve spool will be distributed substantially uniformly around the circumference of the valve and valve seat with the result that there are no regions where the flow takes place at unduly high velocities. The construction of the present valve thus substantially eliminates non-uniform flow and resulting regions of excessively high velocity, which, if present, would contribute greatly to the production of noise at impermissible levels.

DESCRIPTION OF A PREFERRED EMBODIMENT

Figure 1:
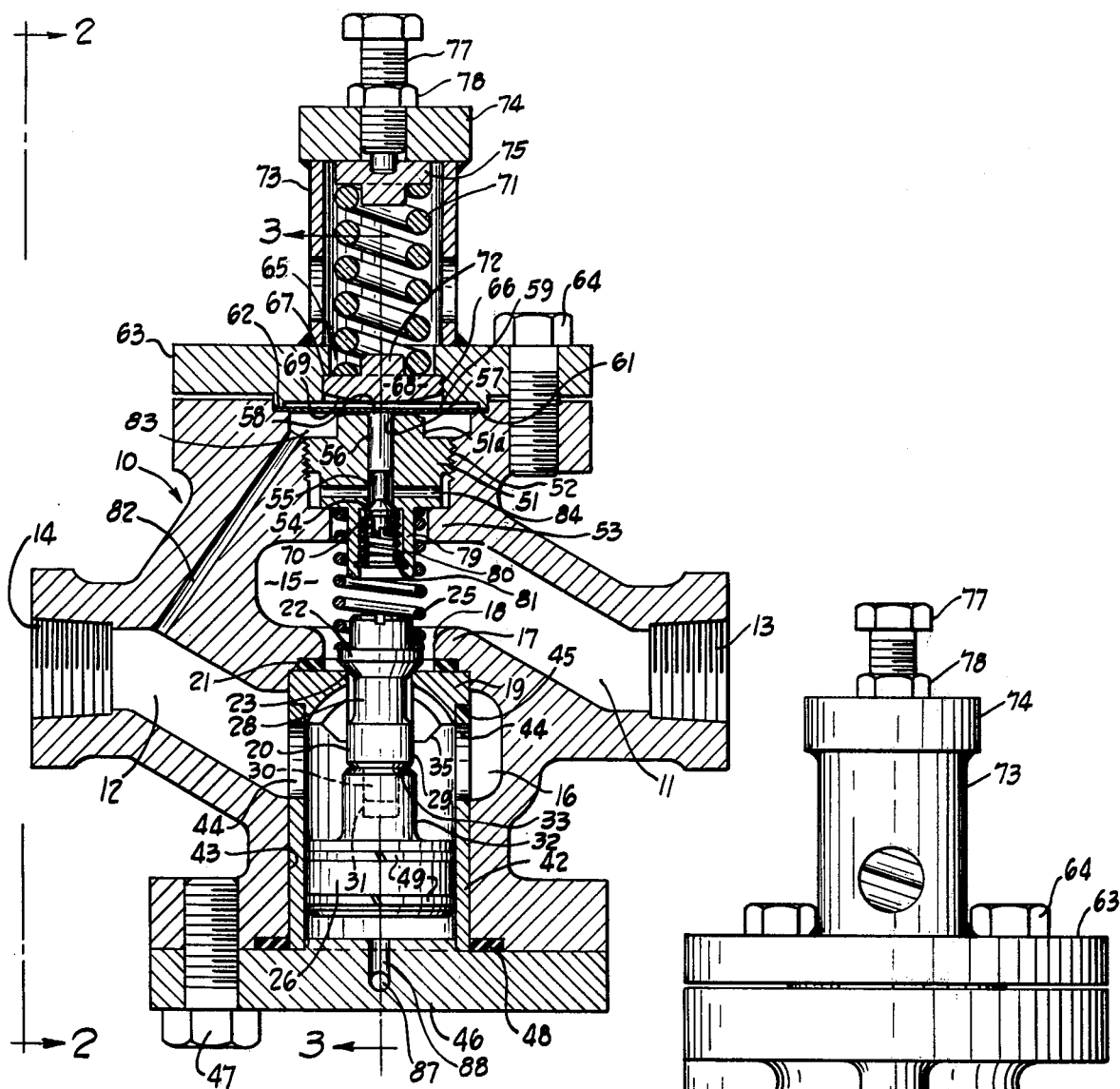
FIG. 1 is a vertical section through a pressure reducing valve made according to a preferred form of the invention, with parts broken away for purposes of illustration.
Figure 2:
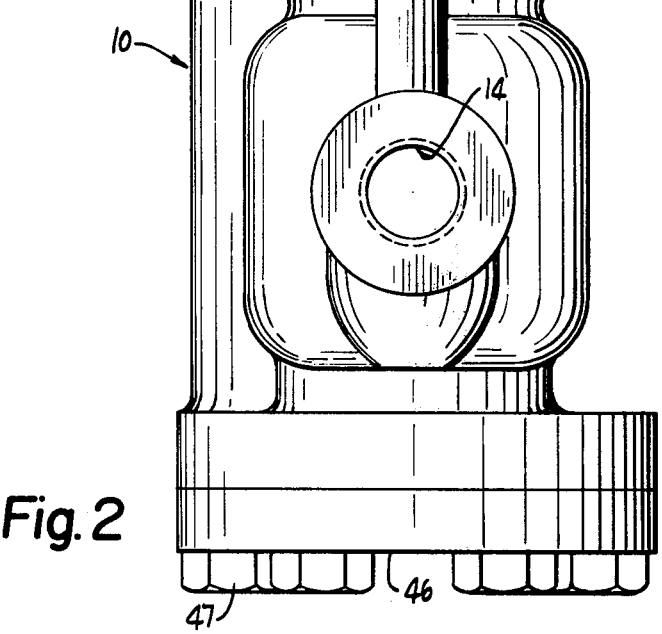
FIG. 2 is an end elevational view of the valve of FIG. 1, taken as indicated by the line 2—2 of FIG. 1.

As shown in the drawings, a preferred form of pressure reducing valve made according to the present invention comprises a housing 10 preferably in the form of a casting having an inlet passage 11 and a discharge passage 12, each provided with means such as the pipe threads 13 and 14 for connection to external fluid conduits. Inlet passage 11 leads to an annular inlet chamber 15, while discharge passage 12 leads from an annular outlet chamber 16. Chambers 15 and 16 are separated by a web or partition 17, formed integrally with the housing and having an orifice 18 which is controlled by a main valve assembly made up of a main valve seat member 19 and a valve spool 20 having a bevelled head 22 that is adapted to make seating engagement with the valve seat 23. An annular gasket 21 provides a seal between the valve seat member 19 and the under side of the web 17. The main valve is urged toward the seat by a coil spring 25 disposed in the inlet chamber 15 and the valve is urged in directions away from its seat by a piston assembly 26 that engages the lower end of the valve spool and is disposed in the lower part of the outlet chamber 16.

Beneath the valve head 22 the spool 20 has a portion 28 of reduced diameter. Beneath that there is a cylindrical guiding portion 29 that is slidable in the valve seat member 19. The valve spool terminates in a downwardly extending central cylindrical projection 30 that projects into a recess 31 in the upwardly projecting boss 32 of the piston 26. The top of the projecting boss 32 engages a shoulder 33 at the juncture of the lower end of the guiding portion 29 and the projection 30 of the valve spool. The piston, as described below, is arranged to urge the valve in directions away from its seat and against the action of the spring 25 in order to control the annular flow passage through the orifice 18 and between the valve head 22 and the valve seat 23.

Figure 5:
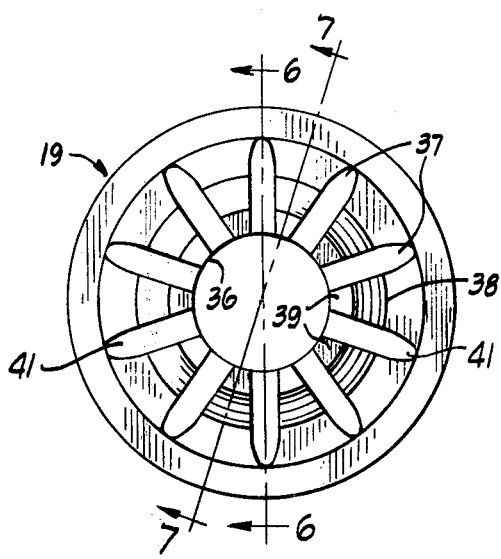
FIG. 5 is a view to an enlarged scale of the valve seat member, looking at the under side of the member.
Figure 6:
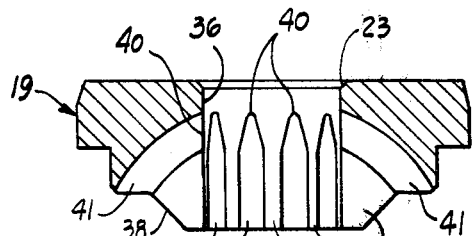
FIG. 6 is a sectional view of the valve seat member to an enlarged scale, taken as indicated by line 6—6 of FIG. 5.
Figure 7:
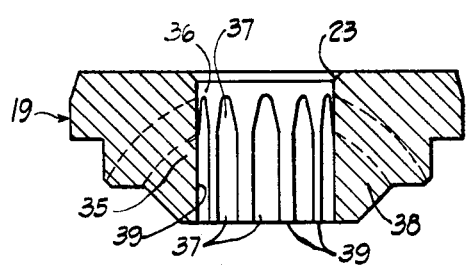
FIG. 7 is a sectional view of the valve seat taken as indicated by line 7—7 of FIG. 5, and showing the valve spool in position therein.

In order to provide a guide for the valve spool as well as to prevent the generation of noise at unacceptable levels by the flow of high pressure gas through the valve, the valve seat member 19 has a guiding and flow-controlling portion 35 extending downwardly below the seat 23 and having a central bore 36 therein that is sized to make a sliding fit with the cylindrical portion 29 of the valve spool 20, thereby to guide the spool and center it accurately with respect to the valve seat itself. This portion of the valve seat member is provided with circumferentially spaced internal grooves 37 that extend radially outwardly from the central bore 36 of the valve seat member, the grooves being separated by intermediate portions or lands 38, the internal arcuate end surfaces 39 of which engage and guide the cylindrical portion 29 of the valve spool. The end surfaces 39 define a cylinder that is co-axial with the valve seat. The grooves preferably lie in planes that are parallel to the axis of the valve spool and valve seat and the bottoms of the grooves are shaped so that the depth of the grooves increases progressively from their inner ends 40, where they intersect the bore 36 of the valve seat member, to a maximum depth where the grooves terminate with their outer ends 41 lying in a circle having a diameter substantially greater than the diameter of the valve seat. The bottoms of the grooves may conveniently be arcuate as shown, and the walls of the grooves preferably converge slightly near the bottoms of the grooves as shown in FIG. 5.

It will be noted that with this arrangement the steam or other gas flowing through the annular orifice defined by the valve seat and valve head is constrained to flow outwardly in a number of streams through the grooves 37. The depth and therefore the cross-sectional area of the grooves progressively increases in the direction of the flow of steam and the steam is thus permitted to expand in a controlled fashion. As the valve spool is moved upwardly to permit increased flow through the valve, the area through which the steam can enter the grooves 37 is reduced slightly by the cylindrical portion 29 of the spool, but the area available for entry of steam into the grooves always is greater than the area of the annular orifice defined by the valve head 22 and the valve seat 23. The presence of the grooves and the guiding lands beyond the valve seat insures substantially even distribution of the flow of steam through the valve seat and reduces the likelihood of the development of areas of uneven spacing between the valve and its seat and the development of zones in which the velocity of flow of steam through the valve becomes excessive and produces excessive levels of noise.

In order to provide a good working surface for the piston as well as to retain the valve seat member 19 in position within the housing, a sleeve 42 is disposed within the inner surface of a bore 43 extending downwardly from the chamber 16 to the exterior of the housing. The sleeve is provided with apertures 44 to provide communication between the interior of the sleeve and the outlet chamber 16 so that the upper side of the piston 26 is subjected to discharge pressure in the system. The upper end of the sleeve engages an annular shoulder 45 on the valve seat member 19 and the lower end of the sleeve engages the upper surface of a closure plate 46, which is secured to the housing as by cap screws 47, leakage being prevented by an annular gasket 48 that surrounds the bottom end of the sleeve and is disposed in an annular groove in the bottom of the housing. Sealing between the sleeve and the piston is provided by conventional piston rings 49.

It will be evident that with this arrangement the main valve spool 20, valve seat member 19, spring 25, actuating piston 26 and sleeve 42 can all be removed from the housing for repair or replacement, if necessary, simply by removing the cap screws and removing these parts downwardly through the cylindrical bore 43 of the housing. When the parts are replaced, the sleeve 42 urges the valve seat member 19 upwardly into sealing engagement with the gasket 21. Thus, assembly as well as removal of the main valve and its associated parts can be accomplished easily and rapidly without requiring the breaking of the connections between the valve and external fluid conduits, so long as there is sufficient room available to permit removal of the cover plate and downward removal of the parts.

In order to control the flow of steam or other gas under pressure to the under side of the piston assembly 26, a pilot valve assembly is disposed in the inlet chamber 15 above the partition 17. This assembly comprises a pilot valve body 51 that is threaded into a threaded opening 52 in the upper part of the housing 10 above an apertured web 53 upon which the body 51 is seated. Body 51 has a valve seat 54 that is engaged by the head of a pilot valve spool 55. The upper portion or stem 56 of the valve spool 55 is guided as shown by a bore 57 in the body 51 and the rounded end 58 thereof projects slightly above the upper end 51a of the body, where it engages a diaphragm 59, the edges of which are clamped in sealing engagement between an annular shoulder 61 formed in the valve housing 10 and a downwardly extending annular flange 62 that is provided on the under side of a closure plate 63 which is secured to the housing 10 as by cap screws 64.

In order to provide for the application of force to the top of the valve stem 56 tending to move the valve head 70 away from the seat 54, the plate 63 is provided with an opening 65 that is co-axial with the threaded opening 52, the opening in the web 53 and also with the orifice 18 in the web 17. The opening 65 has an enlarged lower portion 66 providing an annular shoulder 67 which acts as a stop to limit upward movement of a plunger 68 that is disposed in the enlarged portion. Plunger 68 has a curved bottom surface 59 that engages the upper surface of the diaphragm 59 and thereby applies a force through the diaphragm to the stem 56 of the pilot valve, tending to move the head 70 of the valve from its seat 54. As explained below, moving the valve from its seat admits fluid under pressure to the under side of the piston 26, thus tending to raise the main valve head 22 from the main valve seat 23.

The plunger 68 is urged downwardly by a spring 71 that engages the upper portion of the plunger and is centered by a projection 72 on the plunger. The spring is enclosed by a spring retainer 73, preferably welded to the upper surface of the plate 63 and provided at its upper end with a supporting member 74 that is welded thereto, the under side of the supporting member acting as a stop for the spring seat 75 that engages the upper end of the spring 71. Supporting member 74 is centrally threaded to receive an adjusting screw 77, the lower end of which engages a recess in the upper side of the spring seat 75. By adjusting the position of the screw 77 in the supporting member 74, the tension on the spring 71 can be varied and thus the force exerted by the plunger 68 on the upper surface of the diaphragm 59 can be varied. Screw 77 may be locked in the desired position of adjustment as by a lock nut 78.

In order to insure that the head 70 of the pilot valve will remain in engagement with its seat except when it is displaced therefrom by the force of the spring 71 acting through the plunger 68 and diaphragm 59, the valve body 51 is provided with a downwardly projecting integrally formed sleeve 79 within which is disposed a spring 80 that engages the under side of the head of the pilot valve and is supported within the sleeve as by a conventional snap ring 81. The under side of the head of the pilot valve is also subjected to the pressure within the inlet chamber 15, tending to hold it against its seat.

In order to balance the force exerted by the spring 71 and tending to open the pilot valve, a drilled passageway 82 is formed in the housing 10. This leads from the discharge passageway 12 to the annular space 83 surrounding the upper portion of the body member and disposed immediately beneath the diaphragm 59. The pressure exerted by the fluid on the under side of the diaphragm acts against the force exerted by the plunger 68 under the influence of the spring 71 and thus an increase in pressure in the discharge passage 12 will result in a displacement of the diaphragm 59 upwardly against the action of the plunger and spring, thereby permitting the pilot valve to be moved toward its seat under the influence of the spring 80 and thus, as explained below, cut off or reduce the supply of fluid under pressure to the under side of the piston 26.

Figure 3:
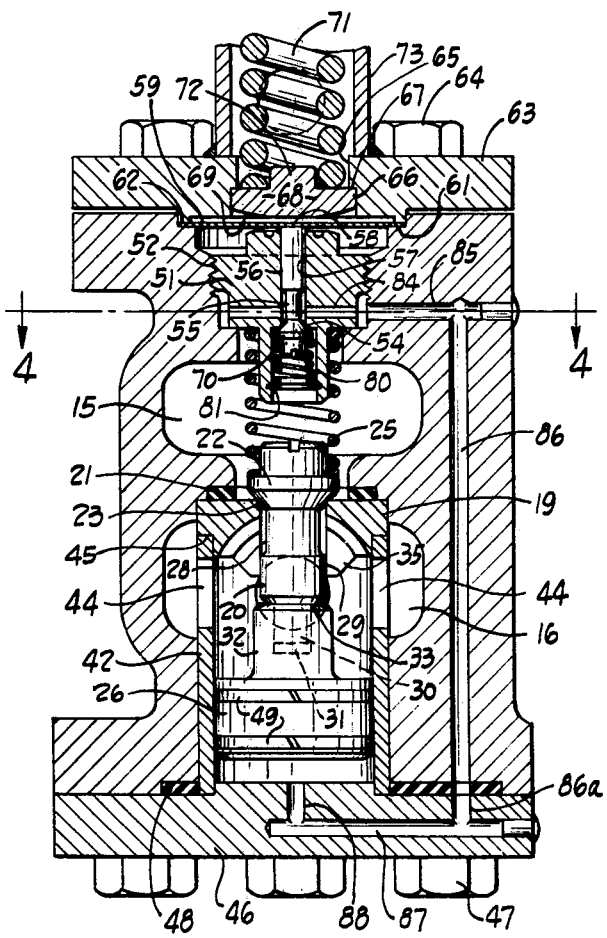
FIG. 3 is a transverse vertical section through the valve of FIG. 1, taken at right angles to FIG. 1.
Figure 4:
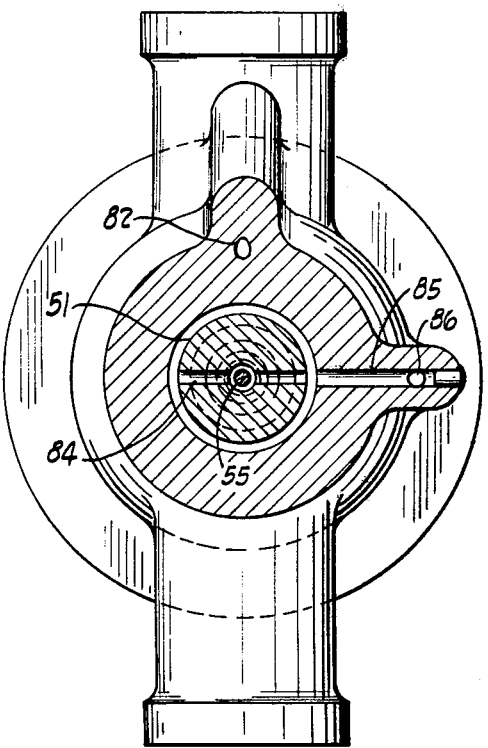
FIG. 4 is a horizontal section, taken as indicated by line 4—4 of FIG. 3.

In operation, assuming the supply of steam to the valve to be shut off, the pilot valve 55 will be held in open position under the action of the spring 71 acting through diaphragm 59 and valve stem 56. The main valve is held in closed position against its seat by spring 25, there being no pressure beneath the piston 26. As soon as steam under pressure enters the inlet to the casing and builds up sufficiently, it will flow through the sleeve 79 of the pilot valve body 51, through the annular orifice between the pilot valve and its seat to the cross-drilled passage 84 in the valve body, and then to the annular space surrounding the lower portion of the valve body. From there, as shown particularly in FIG. 3, the steam can flow through the horizontal drilled passage 85, the outer end of which is closed by a plug, then downwardly through the vertical passage 86 in the valve body, a short vertical passage 86a in the closure plate 46 leading to a horizontal passage 87 in the closure plate, the outer end of which is closed by a plug, and then to a vertical passage 88 leading to the space within the sleeve 42 beneath the piston 26. When the pressure beneath the piston becomes sufficient to overcome the force of the spring and the fluid pressure above the main valve head 22, the main valve is lifted from its seat and fluid can then flow through the annular orifice between the main valve and its seat, then through the grooves 37 of the valve seat member. The grooves, as noted above, serve to distribute the flow substantially uniformly around the valve seat, thereby preventing zones of excessive velocity and reducing the generation of noise. The steam then flows through the openings 44 in the wall of sleeve 42 to the discharge chamber 16, and then to the outlet passage 12.

Pressure in the outlet passage 12 is applied through the passage 82 in the valve body to the under side of diaphragm 59, and when this pressure reaches a sufficient value, the diaphragm is lifted against the force of the spring 71 exerted through the plunger 68, and the pilot valve is closed by the force of the spring 80, thus shutting off the flow of steam to the cross-drilled passage 84 and thence through the passages described above to the under side of the piston 26. The resulting reduction in pressure beneath the piston 26 permits the main valve spool to be moved downwardly by the spring 25 until the valve engages the valve seat and shuts off flow of steam through the valve. The ensuing reduction in pressure on the discharge side of the valve results in the opening of the pilot valve by the action of spring 71 and the cycle is repeated. The pressure at which the pilot valve is opened and closed can be controlled by adjustment of the adjusting screw 77 and the characteristics of the operation of the valve can be varied by the stiffness of the diaphragm 59, the relative strength of the various springs and the size of the piston 26. These are factors known to those skilled in the art, the operation of the valve being generally similar to the valves of the prior art.

The present valve, however, is superior to prior art valves because of its compact design and because of the fact that the parts of the valve that are subject to wear, these being the pilot valve assembly and the main valve and piston assembly, can easily be replaced. Thus, simply by removing the cap screws 64, the upper closure plate 63 can be removed from the valve body, giving access to the entire pilot valve assembly which can then be removed as a unit by unscrewing the pilot valve body 51 from the threaded opening 52, the upper end 51a of the valve body 51 being provided with appropriate wrench engaging surfaces for this purpose. Similarly, the main valve and its control piston 26, together with the main valve seat and the guiding sleeve for the piston 26, can readily be removed by removing the cap screws 47 and the lower closure plate 46. These operations of removal and similarly replacement of these parts can be carried out easily and quickly without requiring the valve to be disconnected from the external fluid circuits with which it is associated.

Furthermore, as explained above, the construction of the main valve seat, which provides a series of radially disposed, circumferentially spaced, outwardly extending grooves through which the steam is constrained to flow, improves the uniformity of distribution of flow around the orifice between the valve and its seat, prevents development of local zones of unduly high velocity which result in the generation of noise, and provides for controlled expansion of the steam into the space within the sleeve 43 and the discharge chamber 16 where further expansion takes place. It is to be noted that the length of the cylindrical portion 28 of the valve spool is preferably such that the openings of the grooves 37 are not substantially affected by the movement of the spool. The cylindrical portion 28 is long enough so that the guiding portion 29 at maximum opening of the main valve is disposed below the entries to the grooves and hence does not affect the flow of steam through the valve.

It will be evident that features of the invention can be adapted to valves of different types and that various changes and modifications can be made in the invention without departing from the spirit and scope thereof. The essential characteristics of the invention are defined in the appended claims.

I claim:

1. A valve for controlling the flow of an expandable fluid at high pressure comprising a housing having an inlet passage leading to an inlet chamber, an outlet chamber and a discharge passage leading therefrom, a partition separating the inlet chamber from said outlet chamber, an opening in said partition providing communication between said inlet chamber and said outlet chamber, means for controlling the flow of said expandable fluid through said opening comprising a valve seat positioned in said opening adjacent said inlet chamber, flow-control means disposed downstream of said partition, a valve spool slidably mounted for movement with respect to said valve seat and having a valve head extending upstream from said valve seat, said valve head having a portion adapted to make sealing engagement with said valve seat, said valve spool having a cylindrical portion downstream of said valve head, means for controlling the position of said valve spool with respect to said valve seat, said flow-control means having a plurality of radially extending circumferentially spaced internal grooves disposed downstream from said valve seat, said grooves being separated by intermediate lands having inner surfaces lying in a circle that is coaxial with said valve seat and surrounding said cylindrical portion of said valve spool, said cylindrical portion of said valve spool directing expandable fluid flowing through said valve seat to flow through said grooves when said valve head is displaced from engagement with said valve seat, said grooves extending downstream from a zone adjacent said valve seat, the downstream ends of said grooves communicating with said outlet chamber whereby the flow of fluid through the annular orifice between said valve head and said valve seat is distributed substantially uniformly throughout the circumference of said orifice and the development of zones of excessive velocity of flow is substantially prevented, said cylindrical portion of said valve spool slidably engaging and guided by said lands, said valve spool having an intermediate portion of reduced diameter as compared to the diameter of the said cylindrical portion that engages and is guided by said lands, and said intermediate portion of reduced diameter being disposed between said valve head and the said cylindrical portion that engages and is guided by said lands.

2. A valve for controlling the flow of an expandable fluid at high pressure comprising a housing having an inlet passage leading to an inlet chamber, an outlet chamber and a discharge passage leading therefrom, a partition separating the inlet chamber from said outlet chamber, an opening in said partition providing communication between said inlet chamber and said outlet chamber, a valve seat positioned in said opening, a valve spool movable with respect to said valve seat and having a valve head, said valve head having a portion adapted to make sealing engagement with said valve seat, means for controlling the position of said valve head with respect to said valve seat to control flow of the expandable fluid from said inlet chamber to said outlet chamber, flow control means disposed downstream of said valve seat for minimizing noise created by the flow of the expandable fluid, said flow control means comprising means downstream of said valve seat defining an annular chamber into which the fluid flows after passing through said opening, said flow control means having a plurality of symmetrically arranged radially extending circumferentially spaced internal grooves disposed downstream of said chamber for distributing the flow from said chamber radially and uniformly throughout a circumference of the chamber, said grooves being separated by intermediate lands having inner surfaces lying in a circle that is coaxial with said valve seat and said chamber, and the downstream ends of said grooves communicating with said outlet chamber.

3. A valve as defined in claim 2 wherein said grooves extend radially outwardly and downwardly relative to said valve seat, each of said grooves has a bottom which continuously curves as it extends from said chamber toward said outlet chamber, and the area available for entry of fluid from said chamber into said grooves is always greater than the flow area between said valve head and valve seat.

4. A valve as defined in claim 2 wherein said chamber is defined in part by a cylindrical portion of said valve spool.

* * * * *